United States Patent
Feldmann et al.

(10) Patent No.: US 11,008,946 B2
(45) Date of Patent: May 18, 2021

(54) TURBOMACHINE COMPONENT ASSEMBLY

(71) Applicant: MTU Aero Engines AG, Munich (DE)

(72) Inventors: Manfred Feldmann, Eichenau (DE); Janine Sangl, Dachau (DE); Armin Kammerer, Roehrmoos (DE)

(73) Assignee: MTU Aero Engines AG, Munich (DE)

( * ) Notice: Subject to any disclaimer, the term of this patent is extended or adjusted under 35 U.S.C. 154(b) by 69 days.

(21) Appl. No.: 16/445,482

(22) Filed: Jun. 19, 2019

(65) Prior Publication Data
US 2020/0011249 A1    Jan. 9, 2020

(30) Foreign Application Priority Data

Jun. 28, 2018  (DE) .......................... 102018210599.5

(51) Int. Cl.
*F01D 11/00*    (2006.01)
*F02C 7/28*    (2006.01)

(52) U.S. Cl.
CPC .............. *F02C 7/28* (2013.01); *F01D 11/005* (2013.01); *F05D 2220/32* (2013.01); *F05D 2240/12* (2013.01)

(58) Field of Classification Search
CPC .......... F02C 7/28; F01D 9/042; F01D 11/003; F01D 11/005; F01D 25/246; Y02T 50/60; F05D 2220/32; F05D 2240/12; F05D 2240/57
See application file for complete search history.

(56) References Cited

U.S. PATENT DOCUMENTS

| | | | |
|---|---|---|---|
| 3,893,786 A | 7/1975 | Rahnke et al. | |
| 6,902,371 B2 | 6/2005 | Andersson | |
| 7,780,174 B2 * | 8/2010 | Wunderlich | F01D 11/005 277/632 |
| 7,972,107 B2 * | 7/2011 | Dervaux | F01D 25/246 415/115 |
| 9,057,274 B2 | 6/2015 | Boeck | |

(Continued)

FOREIGN PATENT DOCUMENTS

| | | |
|---|---|---|
| DE | 102008003110 A1 | 7/2008 |
| DE | 102010005153 | 7/2011 |

(Continued)

*Primary Examiner* — Igor Kershteyn
(74) *Attorney, Agent, or Firm* — Davidson, Davidson & Kappel, LLC

(57) ABSTRACT

A sealing assembly for sealing a first sealing bank of a first static component and a second sealing bank of a second static component of an axial turbomachine, the static components axially movable relative to each other, the sealing assembly including the two static components and a sealing element segmented in the circumferential direction, a first end of the sealing element being axially coupled in a groove at the first sealing bank facing an opposite second end bearing axially against the second sealing bank, as well as a stator vane assembly including a casing component of an axial turbomachine, which has at least one casing hook, and further including a stator vane component having at least one stator vane disposed on a platform and at least one stator vane hook which projects from the platform and bears against the casing hook, the stator vane hook having formed therein at least one through-hole for supply of cooling air.

17 Claims, 1 Drawing Sheet

(56) References Cited

U.S. PATENT DOCUMENTS

| | | |
|---|---|---|
| 9,945,241 B2 | 4/2018 | Feldmann et al. |
| 2007/0231123 A1 | 10/2007 | Dervaux et al. |
| 2007/0284832 A1 | 12/2007 | Wunderlich et al. |
| 2008/0166233 A1* | 7/2008 | Johnson .................. F01D 9/023 415/230 |
| 2013/0266416 A1* | 10/2013 | Bergman .............. F01D 25/246 415/1 |
| 2014/0119902 A1 | 5/2014 | Feldmann et al. |
| 2014/0140825 A1 | 5/2014 | Clouse et al. |
| 2014/0366556 A1 | 12/2014 | Banks et al. |
| 2017/0089211 A1* | 3/2017 | Broomer ............... F01D 11/005 |

FOREIGN PATENT DOCUMENTS

| | | |
|---|---|---|
| DE | 10 2013 212 501 A1 | 12/2014 |
| EP | 0770761 A1 | 5/1997 |
| EP | 1845236 A2 | 10/2007 |
| EP | 2 853 692 A1 | 4/2015 |
| EP | 3147461 A1 | 3/2017 |
| EP | 3287602 A1 | 2/2018 |
| GB | 2378730 B | 2/2003 |
| JP | 2011241839 A | 12/2011 |
| WO | WO2015089431 | 6/2015 |

* cited by examiner

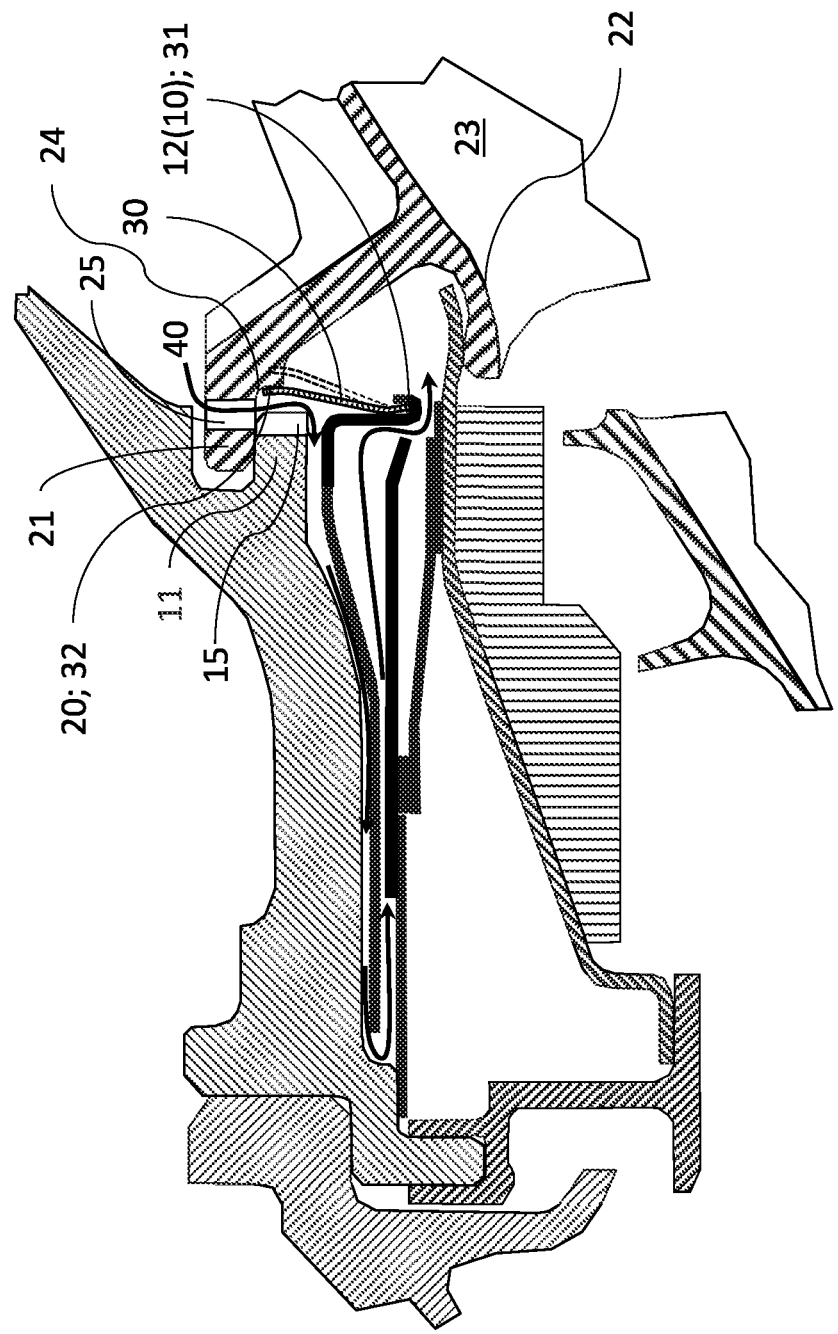

TURBOMACHINE COMPONENT ASSEMBLY

This application claims the benefit of German Patent Application DE 102018210599.5, filed Jun. 28, 2018 and hereby incorporated by reference herein.

The present invention relates to an assembly including two static components of an axial turbomachine, in particular a gas turbine, as well as to a method for sealing a first sealing bank, i.e. a sealing surface, and a second sealing bank, i.e. a second sealing surface, of the static components.

BACKGROUND

The Applicant's EP 2 853 692 A1 describes a stator vane assembly including a casing component having a casing hook, and further including a stator vane component having a stator vane disposed on a platform and a stator vane hook projecting from the platform and contacting the casing hook. This stator vane assembly has a sealing element that is fixed to a web by means of an end hook having a stiffening effect.

The Applicant's DE 10 2013 212 501 A1 also describes a stator vane assembly including a casing component having a casing hook, and further including a stator vane component having a stator vane disposed on a platform and a stator vane hook projecting from the platform and contacting the casing hook. The stator vane hook is formed with cutouts in the form of recesses in the end face thereof.

SUMMARY OF THE INVENTION

It is an object of an embodiment of the present invention to improve a turbomachine, in particular the assembly and/or the operating characteristics performance thereof.

The present invention provides a gas turbine having at least one component assembly as described herein.

In accordance with a first aspect of the present invention, a (sealing) assembly in or with which a first sealing bank of a first static component and a second sealing bank of a second static component of an axial turbomachine, in particular a turbine or compressor stage of a gas turbine, are sealed, and/or which is intended, in particular adapted, and/or used for this purpose, includes the two static components, which are axially movable relative to each other, in particular due to different thermal expansions during operation or the like, and a sealing element which is segmented in the circumferential direction of the turbomachine. In one embodiment, this allows (pre-)stresses in the sealing element to be advantageously distributed in the circumferential direction.

In this regard, reference is also made to the Applicant's EP 2 853 692 A1 related to US Patent Publication No. 2015/0102565A1, mentioned at the outset, the contents of which are incorporated into the present disclosure in their entirety.

In accordance with the first aspect of the present invention, a first, in particular radial, end of the sealing element is axially coupled at, in particular in, a groove in the first sealing bank of the first component, this groove facing an, in particular (also) radially, opposite second, in particular radial, end of the sealing element, this second end of the sealing element bearing axially against the second sealing bank.

In one embodiment, this makes it possible to simplify the installation of the sealing element. In one embodiment, additionally or alternatively, this permits a simpler configuration and/or a more flexible use of the sealing element. In one embodiment, additionally or alternatively, this makes it possible to reduce the bending stiffness of the sealing element and to thereby improve the sealing action thereof.

In one embodiment, an axial direction is parallel to an axis of rotation or (main) machine axis of the turbomachine, a circumferential direction is a direction of rotation about this axis, and a radial direction is perpendicular to the axial and circumferential directions.

In one embodiment, the second sealing bank has a stop for limiting radial movement of the sealing element. In one embodiment, a (radial groove) depth of the groove is greater than a (maximum, radial) distance between the sealing element, in particular the second end thereof, and the stop.

In one embodiment, this makes it possible to (further) simplify the installation of the sealing element.

In one embodiment, a groove width of the groove at or in the first component is no more than three times, in particular no more than two times, in one embodiment less than two times an, in particular maximum, minimum or average, wall thickness of the sealing element.

In one embodiment, this makes it possible to (further) improve the installation and/or the sealing action of the sealing element.

In one embodiment, the groove at or in the first component is produced by a deformation process; i.e., by deforming, in particular, a piece of sheet metal. In one embodiment, this makes it possible to reduce stiffness and weight.

In another embodiment, the groove at or in the first component is produced by a material-removal process, in particular by chip-removing machining, for example, by an, in particular machined, recess or the like. In one embodiment, this makes it possible to improve a stiffness.

In another embodiment, the groove at or in the first component is produced by joining two groove legs, in particular pieces of sheet metal, or is formed or defined by two groove legs that are not fixedly joined together. In one embodiment, this simplifies manufacture.

In one embodiment, a centerline of the sealing element forms an average angle of no more than 45°, in particular no more than 30°, in one embodiment no more than 15°, with a radial direction of the turbomachine. In other words, in one embodiment, a cross section of the sealing element perpendicular to the circumferential direction is oriented at least substantially radially, but may also be oriented obliquely, thus forming a conical surface.

In an embodiment, this makes it possible to (further) improve the installation and/or the sealing action of the sealing element.

In one embodiment, the first sealing bank is disposed radially inwardly of the second sealing bank.

In one embodiment, this makes it possible to (further) improve the installation of the sealing element.

In another embodiment, the first sealing bank is disposed radially outwardly of the second sealing bank.

In one embodiment, this makes it possible to (further) improve the sealing action of the sealing element.

In one embodiment, a stiffness, in particular a bending stiffness, of the first end of the sealing element and a stiffness, in particular a bending stiffness, of the second end of the sealing element differ by no more than 35%, in particular no more than 25%, in one embodiment no more than 10%. Additionally or alternatively, in one embodiment, the first end of the sealing element, which is coupled in the groove, has no hem or folded edge.

In one embodiment, this makes it possible to (further) improve the sealing action of the sealing element, respectively, in particular in combination.

In one embodiment, the sealing element is an annular sector whose cross section is at least substantially an oblong rectangle and which, therefore, both inwardly and outwardly, has substantially the same stiffness.

Additionally or alternatively, the sealing element may be segmented in the circumferential direction and composed of individual segments which, in particular, neighbor, or are adjacent to, each other in the circumferential direction. Each segment may be formed or composed of an in particular single monolithic piece of sheet metal.

In one embodiment, this makes it possible to (further) improve the sealing action of the sealing element.

In one embodiment, the cross section may have a curved shape.

In one embodiment, this allows the sealing element to be advantageously configured to match a surrounding geometry, in particular to yield thereto.

In one embodiment, the first end and/or the second end are/is curved toward the respective sealing bank.

In one embodiment, this makes it possible to (further) improve the sealing action of the sealing element.

In one embodiment, the sealing element is fixedly secured at the first and second static components, in particular (axially) preloaded against the second sealing bank, in a springless manner; i.e., without (additional, separate) springs.

In one embodiment, this makes it possible to avoid impairment or deterioration of the sealing action, in particular due to (thermal) creep and/or due to overflexing of the springs as a result of a large axial movement of the two static components relative to each other, and to thereby (further) improve the sealing action of the sealing element.

In accordance with a second aspect of the present invention, a (stator vane segment) assembly includes a casing component of an axial turbomachine, in particular a turbine or compressor stage of a gas turbine, and a stator vane component of the axial turbomachine, the casing component having at least one casing hook, and the stator vane component having at least one stator vane disposed on a platform and at least one stator vane hook which projects, in particular axially, from the platform and bears, in particular radially, against the casing hook, in one embodiment contacts the same for this purpose. In one embodiment, the stator vane hook is a forward or upstream stator vane hook.

In this regard, reference is also made to the above-mentioned DE 10 2013 212 501 A1, the contents of which are incorporated into the present disclosure in their entirety.

In accordance with the second aspect of the present invention, the stator vane hook is formed with one or more through-holes through which cooling air is passed or fed during operation and/or which is/are intended, in particular adapted, and/or used for this purpose.

In contrast to DE 10 2013 212 501 A1, in which the stator vane hook is formed with cutouts in the form of recesses in the end face thereof, this makes it possible, in one embodiment, to provide a constant diameter for the cooling air, which diameter does not change when the casing hook and the stator vane hook move axially relative to each other.

The one or more through-holes may extend radially, or at least substantially radially; i.e., with a maximum deviation of ±15°, preferably ±10°, in particular ±5°, from a radial direction. This allows the cooling air to flow radially inwardly or radially outwardly through the stator vane hook.

In one embodiment, the axial turbomachine, in particular (the turbine or compressor stage of) the gas turbine, has a stator vane array which includes a plurality of stator vanes and is segmented in the circumferential direction. One or more of these stator vane segments may (each) have, in particular be or form, a stator vane component as described herein. In other words, in one embodiment, the stator vane component is a stator vane (ring) segment of a circumferentially segmented stator vane array or stator vane ring having a plurality of stator vanes.

In one embodiment, this makes it possible to (further) improve the production of the through-hole(s).

In one embodiment, the casing hook has one or more cutouts which are (each) formed by a recess in the end face thereof and which at least partially overlap or clear the or one of the through-hole(s).

In one embodiment, this makes it possible to (further) improve a flow of cooling air. In one embodiment, additionally or alternatively, this makes it possible to (further) improve the manufacture of the casing hook and/or the stator vane hook.

The sealing element may form a boundary for the flow of cooling air and/or a boundary of a cavity that receives or discharges the cooling air flow. Cooling air intake and discharge may be effected by the cooling air flowing through the through-hole.

In one embodiment, a through-hole in accordance with the present invention has an, in one embodiment at least partially cylindrical or conical, closed inner circumferential or lateral surface; i.e., an inlet and/or an outlet having a closed or circumferential edge, whereas a recess in accordance with the present invention has, in one embodiment, an inlet and/or an outlet having an open or interrupted or non-continuous edge.

The first aspect may be implemented without the second aspect and the second aspect may be implemented without the first aspect. In particular, the second aspect may also be combined with a sealing assembly or a sealing element, such as is disclosed, for example, in the Applicant's EP 2 853 692 A1 mentioned at the outset.

The first aspect can generally be used or implemented with particular advantage in stator vane assemblies where a casing component and a stator vane component attached thereto form the two static components of the sealing assembly. In this connection, in an advantageous embodiment, the first and second aspects may be combined with each other.

Accordingly, in one embodiment, the first static component of a sealing assembly in accordance with the first aspect is a casing component which, in one embodiment, has at least one casing hook, and which in particular is connected, in particular in a fixedly coupled manner, to a casing component having a casing hook, in a refinement the casing component of a stator vane assembly in accordance with the second aspect, and/or the second static component is a stator vane component having at least one stator vane disposed on a platform and/or at least one mounting hook which projects from the platform and, in one embodiment, bears against the casing hook, in a refinement the stator vane component of the stator vane assembly in accordance with the second aspect.

Similarly, in another embodiment, the second static component of a sealing assembly in accordance with the first aspect is a casing component which, in one embodiment, has at least one casing hook, and which in particular is connected, in particular in a fixedly coupled manner, to a casing component having a casing hook, in a refinement the casing component of a stator vane assembly in accordance with the second aspect, and/or the first static component is a stator vane component having at least one stator vane disposed on a platform and/or at least one mounting hook which projects from the platform and, in one embodiment, bears against the casing hook, in a refinement the stator vane component of the stator vane assembly in accordance with the second aspect.

Due to the high demands placed on the sealing action and the cooling air flow path, the present invention is used with particular advantage in turbine and compressor stages of gas turbines, in particular aircraft engines.

In accordance with an embodiment of the present invention, in order to seal the first sealing bank of the first static component and the second sealing bank of the second static component, a positive pressure to be sealed, in one embodiment in addition to a corresponding (elastic) preload of the sealing element, presses the second end of the sealing element against the second sealing bank, and/or the sealing assembly, in particular the sealing element, is correspondingly adapted, in particular designed, and/or used in this way. Additionally or alternatively, in one embodiment, in order to seal the first sealing bank of the first static component and the second sealing bank of the second static component, a or the positive pressure to be sealed presses the first end of the sealing element against the first sealing bank, and/or the sealing assembly, in particular the sealing element, is correspondingly adapted, in particular designed, and/or used in this way.

The first and/or second static components or the casing and/or stator vane components may (each) be formed as a single-piece or as multiple pieces. Thus, a component that is connected, in particular in a fixedly coupled manner, to a casing component (also) forms, in particular together with this one casing component, a casing component in accordance with the present invention; a component that is connected, in particular in a fixed (fixedly coupled) manner, to a stator vane component (also) forms, in particular together with this one stator vane component, a stator vane component in accordance with the present invention.

BRIEF DESCRIPTION OF THE DRAWING

Further advantageous refinements of the present invention will become apparent from the dependent claims and the following description of preferred embodiments.

To this end, the sole drawing FIG. 1 shows, in partially schematic form, a sealing and stator vane assembly according to an embodiment of the present invention.

DETAILED DESCRIPTION

FIG. 1 shows a sealing and stator vane assembly according to an embodiment of the present invention in a meridional sectional view through a machine axis of a turbine stage of a gas turbine (extending horizontally but not shown in FIG. 1).

The assembly includes a multi-piece first static component having a casing hook 11 and a groove 12 in a first sealing bank 10 of the first component, as well as a second static component in the form of a circumferentially segmented stator vane component having a second sealing bank 20, at least one stator vane 23 disposed on a platform 22, and a stator vane hook 21 which projects axially from platform 22 and bears against casing hook 11.

These two static components are axially movable relative to each other.

In order to seal first sealing bank 10 and second sealing bank 20, a first end 31 of a circumferentially segmented sealing element 30 is axially coupled in groove 12, which faces an opposite second end 32 of the sealing element, which second end is preloaded and bears axially against second sealing bank 20, and during operation is pressed against second sealing bank 20 by a positive pressure to be sealed of a cooling air flow 40.

In order to apply the preload, sealing element 30 is elastically deformed from an initial undeformed shape (shown in dashed line in FIG. 1) by moving second sealing bank 20 axially toward first sealing bank 10.

The second sealing bank has a stop 24 for limiting radial movement of the sealing element.

The distance between stop 24 and second end 32 is preferably smaller than the (groove) depth of groove 12 or the radial overlap of the sealing element with the groove. This allows the sealing element to be secured in the groove.

Stator vane hook 21 is formed with through-holes 25 for supply or passage of cooling air flow 40 therethrough.

Casing hook 11 has cutouts 15 which are formed by recesses in the end face thereof and which at least partially overlap or clear the through-holes 25.

Although the above is a description of exemplary embodiments, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection as set forth in the appended claims or derived from combinations of features equivalent thereto.

LIST OF REFERENCE NUMERALS 10 first sealing bank
11 casing hook
12 groove
15 recess
20 second sealing bank
21 stator vane hook
22 platform
23 stator vane
24 stop
25 through-hole
30 sealing element
31 first end
32 second end
40 cooling air flow

What is claimed is:

1. A sealing assembly for sealing a first sealing bank of a first static component and a second sealing bank of a second static component of an axial turbomachine, the first and second static components being axially movable relative to each other, the sealing assembly being a stator vane assembly comprising:

the first and second static components and a sealing element segmented in a circumferential direction of the turbomachine, the first static component being one of a casing component having at least one casing hook and a stator vane component having at least one stator vane disposed on a platform and at least one stator vane hook projecting from the platform and bearing against the casing hook, the second static component being the other of the casing component and the stator vane component, a first end of the sealing element being axially coupled in a groove at the first sealing bank of the first component, the groove facing an opposite second end of the sealing element, the second end bearing axially against the second sealing bank;

the stator vane hook having at least one through-hole extending radially through the stator vane hook for supply of cooling air.

2. The sealing assembly as recited in claim 1 wherein the second sealing bank has a stop for limiting radial movement of the sealing element.

3. The sealing assembly as recited in claim 1 wherein a groove width of the groove at the first component is no more than three times a wall thickness of the sealing element.

4. The sealing assembly as recited in claim 1 wherein the groove at the first component is formed by a deformation process, by a material-removal process, or by joining two groove legs, or by two groove legs not fixedly joined together.

5. The sealing assembly as recited in claim 1 wherein a centerline of the sealing element forms an average angle of no more than 45° with a radial direction of the turbomachine.

6. The sealing assembly as recited in claim 1 wherein the first sealing bank is disposed radially inwardly or outwardly of the second sealing bank.

7. The sealing assembly as recited in claim 1 wherein a stiffness of the first end of the sealing element and a stiffness of the second end of the sealing element differ by no more than 35%.

8. The sealing assembly as recited in claim 1 wherein first static component is the casing component and the second static components is the stator vane component.

9. The sealing assembly as recited in claim 1 wherein the second static component is the casing component and the first static component is the stator vane component.

10. A stator vane assembly comprising:
a casing component of an axial turbomachine, the casing component having at least one casing hook; and
a stator vane component of the axial turbomachine, the stator vane component having at least one stator vane disposed on a platform and at least one stator vane hook projecting from the platform and bearing against the casing hook, the stator vane hook having formed therein at least one through-hole for supply of cooling air, wherein the at least one through-hole extends radially through the stator vane hook.

11. The stator vane assembly as recited in claim 10 further comprising a sealing element segmented in a circumferential direction of the turbomachine, a first end of the sealing element being axially coupled in a groove at a first sealing bank of one of the casing component and the stator vane component, the groove facing an opposite second end of the sealing element, the second end bearing axially against a second sealing bank of another of the casing component or the stator vane component.

12. The stator vane assembly as recited in claim 11 wherein the casing hook has at least one cutout formed by a recess in the end face thereof and at least partially overlapping the through-hole, or wherein the sealing element forms a boundary for the flow of cooling air.

13. A gas turbine comprising at least one turbine or compressor stage having at least one sealing assembly as recited in claim 1.

14. A gas turbine comprising at least one turbine or compressor stage having at least one stator vane assembly as recited in claim 10.

15. A method for sealing the first sealing bank of the first static component and the second sealing bank of the second static component of a sealing assembly as recited in claim 1 comprising providing a positive pressure to press the second end of the sealing element against the second sealing bank.

16. A method for sealing the first sealing bank of the first static component and the second sealing bank of the second static component of a stator vane assembly as recited in claim 11, the method comprising providing a positive pressure to press the second end of the sealing element against the second sealing bank.

17. A stator vane assembly comprising:
a casing component of an axial turbomachine, the casing component having at least one casing hook;
a stator vane component of the axial turbomachine, the stator vane component having at least one stator vane disposed on a platform and at least one stator vane hook projecting from the platform and bearing against the casing hook, the stator vane hook having formed therein at least one through-hole for supply of cooling air; and
a sealing element segmented in a circumferential direction of the turbomachine, a first end of the sealing element being axially coupled in a groove at a first sealing bank of one of the casing component and the stator vane component, the groove facing an opposite second end of the sealing element, the second end bearing axially against a second sealing bank of another of the casing component or the stator vane component; wherein the casing hook has at least one cutout formed by a recess in the end face thereof and at least partially overlapping the through-hole, or wherein the sealing element forms a boundary for the flow of cooling air.

* * * * *